United States Patent
Jenkins

[15] 3,646,913
[45] Mar. 7, 1972

[54] TIME-OPERATED SEQUENTIAL DUMPING ANIMAL FEEDER

[72] Inventor: Chester W. Jenkins, 1184 North Waukegan Road, Lake Forest, Ill. 60045

[22] Filed: Sept. 11, 1969

[21] Appl. No.: 856,972

[52] U.S. Cl. ..................119/51.13, 119/51.14, 222/70, 222/170
[51] Int. Cl. ......................................................A01k 5/02
[58] Field of Search..............119/54, 56, 51, 51.11, 5, 51.13, 119/51.12; 222/70, 170; 221/262

[56] References Cited

UNITED STATES PATENTS

| | | |
|---|---|---|
| 1,019,087 | 3/1912 | Rau ........................................119/51.5 |
| 2,275,887 | 3/1942 | Chandler ................................119/56 |
| 2,538,413 | 1/1951 | Chard .....................................222/70 |
| 2,869,638 | 1/1959 | Sullivan ..........................119/51.11 X |
| 3,196,835 | 7/1965 | Bergevin ..........................119/51.5 X |
| 3,382,847 | 5/1968 | Clark ................................119/51.11 |
| 3,403,444 | 10/1968 | Chollet .....................................31/46 |

*Primary Examiner*—Aldrich F. Medbery
*Attorney*—Fitch, Even, Tabin and Luedeka

[57] ABSTRACT

An apparatus for automatically feeding animals at a predetermined time is provided and includes at least one container for holding animal food and means for dumping the container at a predetermined time to cause the contents thereof to be discharged by gravity at a location accessible to the animal.

8 Claims, 7 Drawing Figures

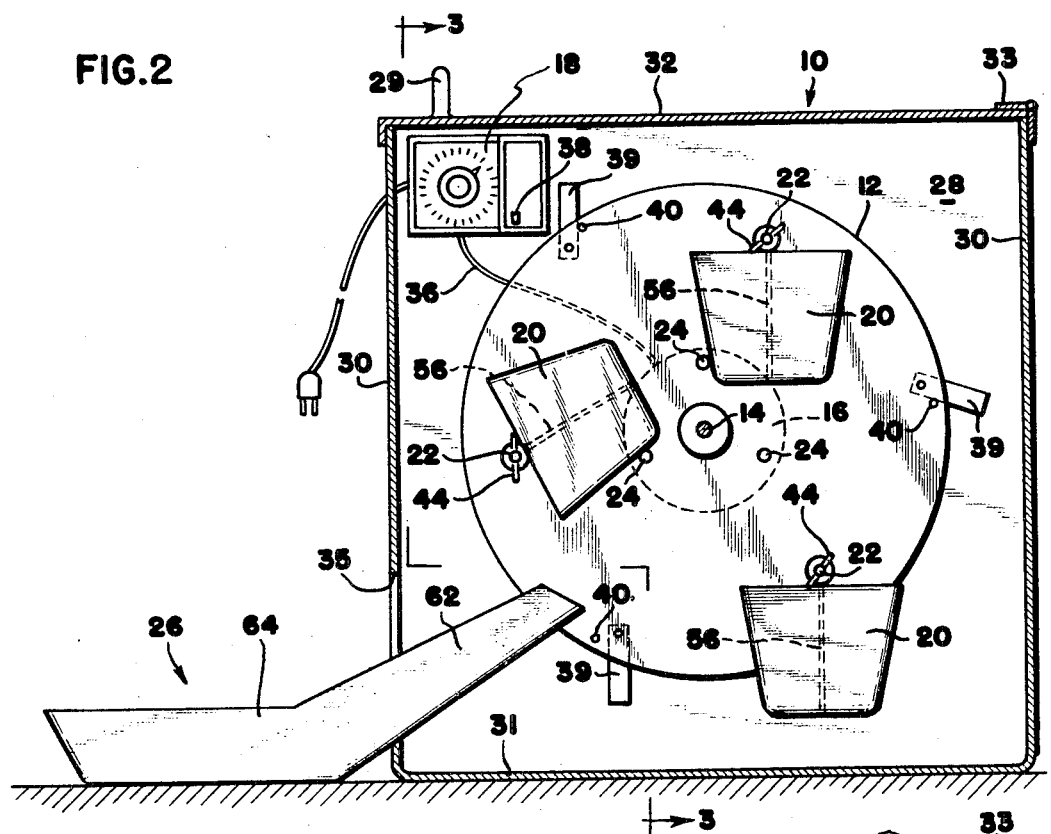
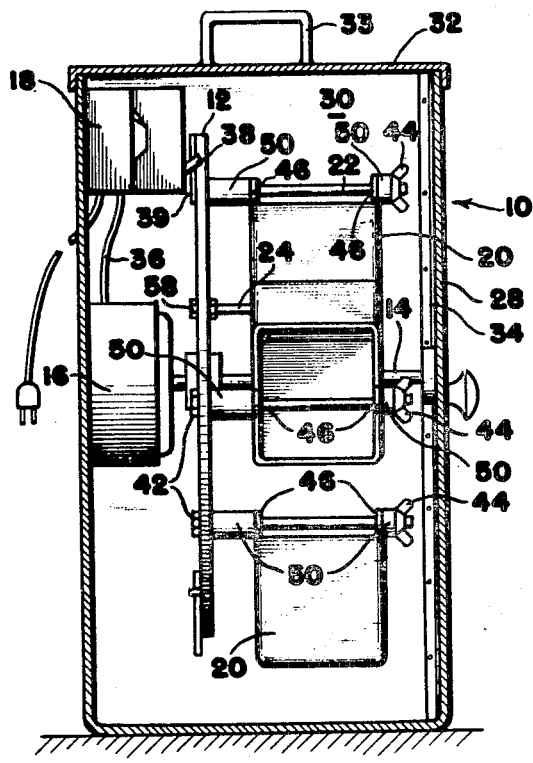
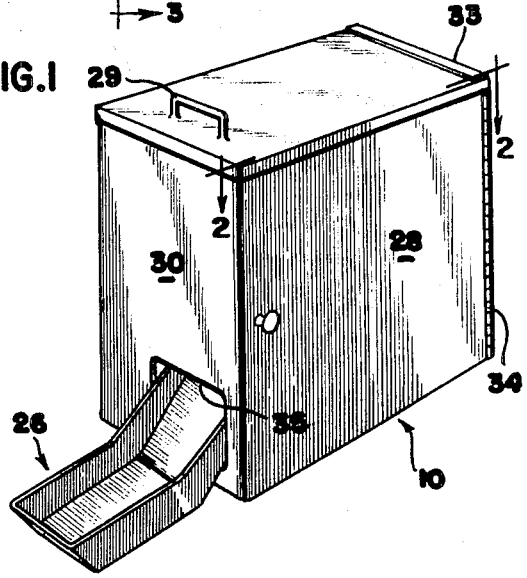
INVENTOR
CHESTER W. JENKINS
Anderson, Luedeka, Fitch, Even, & Tabin
ATTYS.

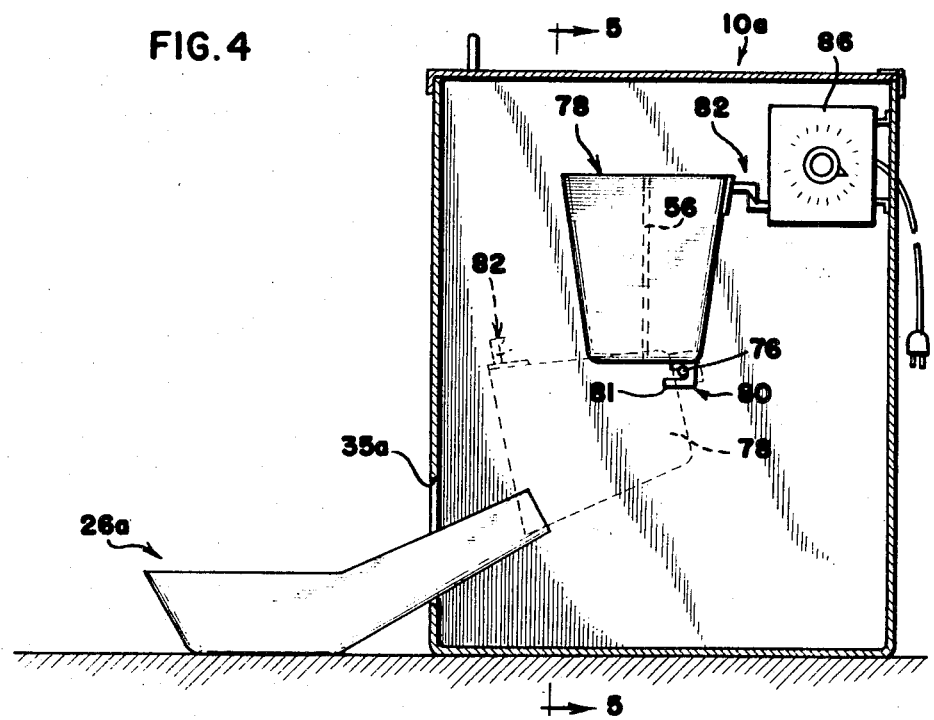
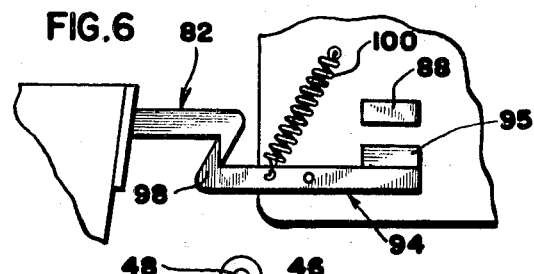
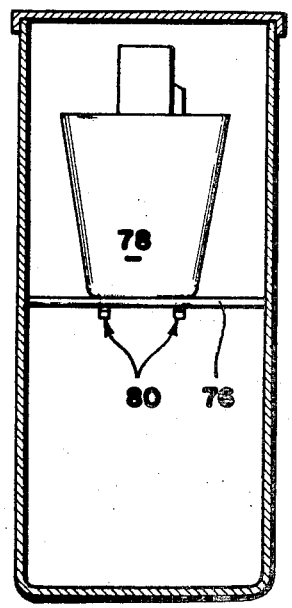
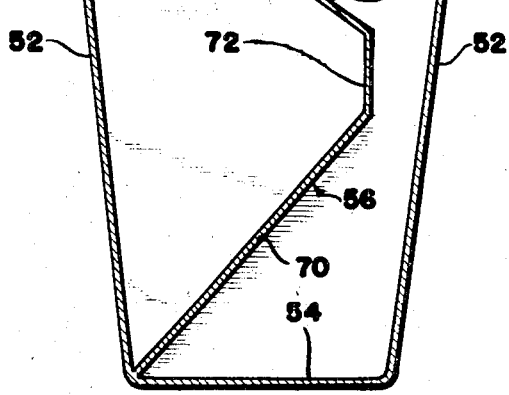

TIME-OPERATED SEQUENTIAL DUMPING ANIMAL FEEDER

The present invention relates to automatic feeding devices adapted to make food and/or liquid available to animals at a predetermined time or times.

In order to properly care for animals, including pets such as dogs, cats, fish and birds, both domestically and in commercial establishments such as pet shops, kennels, and veterinary facilities, it is necessary to provide food for the animals on a fairly inflexible schedule and, except in the case of fish, to provide liquids such as drinking water or milk. It is not practical to provide enough food and water for an extended period of time at one serving since the food generally becomes unpalatable or inedible if allowed to stand exposed to the atmosphere and insects for any duration of time, and certain dry feeds should not be mixed with water until immediately prior to feeding. Moreover, to provide the animal with several days' servings at one time may cause it to overeat and become ill, a situation which is particularly true in the case of fish.

Accordingly, it is normally considered necessary to arrange for someone to be present at feeding times to prepare and provide the food and/or liquid to which the animal is accustomed. However, this frequently presents a serious inconvenience to the owner or caretaker who must either arrange his schedule so as to be present, or who must engage the services of another individual to serve in his stead. The problem arises most frequently in the case of owners of domestic pets whose plans would cause them to be away from home at feeding time and perhaps for several hours thereafter. A common though undesirable solution to this problem at present is to impose upon a friend or neighbor, or to board the pet at a kennel or veterinary facility.

In either the domestic or commercial environment, therefore, there is a need for an automatic feeding apparatus which places the food at the disposal of the animal at the prescribed time without the need for the owner or caretaker being present. The apparatus may also be called upon to provide water as well as food either for drinking purposes or for mixing with a dry animal food.

Accordingly, it is an object of the present invention to provide an automatic animal-feeding apparatus.

It is a further object of the present invention to provide an animal-feeding apparatus which makes food and/or water available to the animal at a predetermined time.

These and other objects of the present invention will become apparent with reference to the following description and drawings.

In the drawings:

FIG. 1 is a perspective view of an apparatus showing various of the features of the present invention;

FIG. 2 is a side view, partially in section, of one embodiment of the present invention taken along line 2—2 of FIG. 1.

FIG. 3 is an end view, partially in section, taken along line 3—3 of FIG. 2;

FIG. 4 is a side view, partially in section, of a second embodiment of the present invention and taken along line 2—2 of FIG. 1;

FIG. 5 is an end view, partially in section, taken along line 5—5 of FIG. 4;

FIG. 6 is an enlarged view of a portion of the apparatus of FIG. 4; and

FIG. 7 is a sectional view of an alternate embodiment of one element of the apparatus shown in FIGS. 1–6.

Briefly, the present invention, as illustrated in the drawings, is an automatic animal-feeding apparatus. In the embodiment of FIG. 1, the apparatus includes a housing 10 which serves as a frame upon which various elements of the apparatus are mounted, as well as an enclosure for such elements. Within the housing 10 a support in the form of a circular plate or disc 12 is mounted and keyed to a shaft 14 defining a horizontal axis. The shaft 14 is connected to and driven by a motor 16 mounted on the housing, and a timer 18 is provided which activates the motor 16 to cause a predetermined degree of rotation of the disc at predetermined times. As illustrated, the disc is provided with three food and/or liquid containers 20 hung in free swinging relation on spindles 22 extending from the disc 12. The swing arc of each container 20 is within reach of a rod 24 which also projects from the disc 12 and serves as a stop which engages the container to impair its free swinging movement in such a manner that, upon continued rotation of the disc 12, the container is inverted, causing its contents to be discharged by gravity at a desired point in the rotation of the disc. The apparatus is also provided with a receptacle 26 for receiving the food discharged from the containers 20, so as to place it within reach of the animal.

Referring again to FIGS. 1 and 2, it can be seen that the housing 10 as illustrated is in the form of a generally rectangular box having vertical sidewalls 28, end walls 30, and a bottom wall 31. A lid 32 having a handle 29 is provided at the upper end of the housing and is hinged, as at 33, to provide easy access to the interior. The walls are preferably made of rigid material such as plastic, wood or sheet metal. One sidewall 28, the right sidewall in the embodiment of FIG. 3, is also hinged, as at 34, to permit the containers 20 to be removed from the spindles 22 by sliding them axially of the spindles for cleaning, filling, and the like. One end wall 30, sometimes hereinafter referred to as the "front" wall, is provided with an opening 35 through which the receptacle 26 extends outwardly of the housing. The housing protects the containers 20 as well as the motor 16 and timer 18 from the elements, and precludes access to the food by the animal before the proper feeding time.

The motor 16 is rigidly mounted on the inside surface of one sidewall 28 of the housing. It may be of any suitable size and preferably incorporates a speed reduction to provide a minimal number of rotations per minute. A motor of the type employed in rotisseries has been found to be suitable.

The timer 18 is mounted on the inside surface of the sidewall 28 of the frame adjacent the upper edge thereof and is electrically connected to the motor 16 by suitable conductors 36. Means are provided for connecting the timer to an electrical outlet (not shown) which provides the power for the entire apparatus. In the illustrated embodiment, the timer 18 includes a toggle switch having an exposed arm 38 which controls its operation. When the timer activates the motor, the arm 38 automatically moves upwardly to an "on" position; the motor is stopped by moving the arm downwardly to the "off" position. Although the timer is illustrated as a conventional timer which is often used to turn lights on and off at a fixed time, the apparatus may also be provided with an alternate form of timer more suited to this particular apparatus.

In the operation of the apparatus, the timer 18 allows current to flow to the motor 16 at predetermined periods of time, e.g., every 8 hours. When the timer begins to operate, the switch arm 38 moves from a downwardly extending position to an upwardly extending position, and current will be supplied to the motor until the switch arm 38 is again moved downwardly. This downward movement and deactivation of the current-supplying portion of the timer could be accomplished automatically by a suitable mechanism or circuit within the timer itself. However, because it is necessary for the disc 12 to rotate only a small degree, i.e., approximately one-third of a complete revolution for each feeding, and because the extent of rotation must be fairly closely controlled to insure that one container, but only one, will be inverted for any one cycle, it is preferable that the operation of the timer be controlled by the rotative position of the disc itself.

Accordingly, three trip arms 39 are pivotally mounted adjacent their ends on the inner surface of the disc 12, i.e., the surface opposite the containers 20. The trip arms 39 are formed of a relatively heavy material so that when they are allowed to swing downwardly about their pivot into engagement with the switch arm 38 of the timer, they will move the switch arm downwardly to the off position. As can be seen in FIG. 2, a pin 40 is provided adjacent each trip arm 39 which limits the free swinging movement of the arm so that it will arrive at the vicinity of the timer in an essentially upright position. As the disc continues to rotate, the center of gravity of the trip arm shifts sufficiently to cause it to swing downwardly and engage the switch arm 38, moving it to the off position.

In the illustrated embodiment of FIGS. 2 and 3, the disc 12 is shown to be of circular configuration and of a thickness sufficient to support the remainder of the apparatus for rotation. It may be made of any suitable material, although wood or composite board provides adequate strength without an excess of weight and expense. The disc is provided with a central opening for mounting on the shaft 14 of the motor, to which it is suitably keyed so that it rotates with the shaft 14. The disc is mounted perpendicular to the shaft 14; thus the plane of rotation of the disc is vertical.

The disc 12 is further provided with two sets or series of holes extending through its thickness. The first series, comprising three holes, is spaced uniformly a short distance from the outer periphery of the disc. The second series, also comprising three holes, is located a short distance from the center of the disc and at a lesser radial distance from the center than the holes of the first set. Each series in the illustrated embodiment lies on a circle having its center coincident with the center of the disc, and the holes of each are uniformly spaced circumferentially from each other. The three spindles 22 mentioned earlier are located in the first series of holes. Each spindle is rigidly affixed to the surface of the disc 12 and extends outwardly therefrom horizontally parallel to the axis of rotation of the disc. The spindles, as illustrated, are of circular cross section and are preferably made of stiff metal such as steel. They are threaded at one end and are held in position in the holes provided therefor by means of locknuts 42 on each side of the disc. The opposite end of each spindle is also threaded and is provided with a wing nut 44 for reasons which will become apparent hereinafter.

One of the containers 20 mentioned earlier is mounted on each of the spindles 22. In the illustrated embodiment, each container 20 takes the form of a plastic bucket suspended at its upper edge from the spindle and, in this regard, the upper rim of each container is provided with a pair of brackets 46 defining loops 48 which extend above the rim (FIG. 7). The spindle is received within the holes defined by the loops so that the container swings freely from the spindle. The wingnut 44 mentioned earlier is then screwed onto the spindle to maintain the container in place. Spacers 50 are carried on each spindle 22 on the outside of the loops 48 so as to maintain the containers in a desired lateral position on the spindle, thereby assuring their proper alignment with the receptacle 26 when the containers are inverted and their contents discharged. The provision of the wingnut or other removable fixing means permits easy removal of the container 20 for cleaning and filling without having to dismantle the remainder of the apparatus. The container itself includes sidewalls 52 and a bottom wall 54 (FIG. 7). The sidewalls may be formed by a circular cylinder or by flat intersecting walls.

If the container is designed to contain more than one type of food, or food and water, a preferably liquid impervious partition 56 is provided as shown in FIGS. 2, 4, and 7. The partition 56 may take the form of a flat or contoured wall dividing the container into two equal compartments, each of which can contain a separate food or liquid. The purpose and use of the partition will be discussed hereinafter in greater detail.

The pins 24 which act as stops are mounted in the second series of holes at the smaller radius, each pin being an equal distance from the central axis of rotation of the disc. These pins, like the spindles 22, extend in parallel relation to the axis of rotation of the disc and are held in their respective holes in the rotating disc by means of locknuts 58. Both the spindles and the pins extend in the same direction from a common surface of the rotating disc 12.

The receptacle 26 from which the animal receives the food or liquid is mounted on the front wall 30 of the housing and takes the form of an inclined channel or trough 62 and a flat horizontal extension or tray 64 at the lower end of the channel. The upper end of the channel 62 is placed so that the food or water from an inverted container 20 will be caught by the channel and directed downward into the tray 64. As can be seen from FIG. 1, only the tray and the lower end of the channel extend through the opening 35 in the front wall 30 of the housing. The remainder of the channel is contained within the housing 10.

In the operation of the apparatus of FIGS. 1 to 3, the timer 18 activates the motor 16, rotating the disc 12 in a counterclockwise direction as viewed in FIG. 2. As a free swinging container 20 passes the uppermost stage of its rotation, the lower portion of the leading wall of the container engages the associated pin 24 referred to earlier. The engagement by the pin restricts the free swinging motion of the container 20 so that, as the disc rotates further in a counterclockwise direction, the container begins to invert or tip. When the rotation proceeds to a point where the leading wall of the container is sufficiently inclined, its contents flow by gravity into the channel 62 of the receptacle 26. Since the channel is inclined, the contents proceed downwardly in the trough to the tray 64. At this point in the rotation of the disc, or perhaps slightly prior thereto, the trip arm 39 engages the switch arm 38 of the timer, moving it to the "off" position, causing the operation of the motor 16 to cease until activated again by the timer. When the timer is again activated, the procedure is repeated. With the present apparatus, three feedings can be accomplished without the presence of a caretaker.

As previously pointed out, the containers 20 can be provided with a partition 56 if desired, although this is not necessary. When the food supplied to the animal is dry feed intended to be mixed with water, however, the partitioned containers can be used to advantage by filling one compartment with water and the other with the dry feed. When the container is inverted, one container will empty and then the other so that a mixing will take place in the channel 62 and tray 64.

It should also be appreciated that more or less than three containers can be provided, and that not all need be filled with food. For example, the timer 18 could be set to activate the motor at 4-hour intervals, first supplying water to the animal and then supplying food, or vice versa.

An alternate container configuration is shown in FIG. 7 and can be employed advantageously in situations where dry animal food is mixed with water. In that embodiment, the partition 56 is liquid impervious and extends across the container from one wall to another to form a complete internal wall separating the container into two compartments as previously described. The wall is not, however, flat, as in FIGS. 2 and 4, but rather is contoured and includes a lower portion 70 which is disposed at an angle to the flat bottom wall 54 of the container and extends upwardly approximately midway of the height of the container. An intermediate portion 72 extends vertically upwardly a short distance perpendicular to the bottom wall, and an upper portion 74 extends to the top of the container while angling back in the opposite direction of the lower portion 70 of the wall. When used in the apparatus of FIG. 2, this container is mounted so that the lower portion 70 of the partition angles backwardly away from the direction of rotation. The compartment defined by the partition and the leading wall of the container contains the dry food and the compartment defined by the trailing wall of the container contains a quantity of water. When employing this embodiment, the rotation of the disc 12 in a counterclockwise direction as viewed in FIG. 2 causes a tilting of the container until the dry feed is discharged from the container. At this point in the rotation the tapered lower portion of the partition has not reached a horizontal orientation; therefore the water is momentarily contained behind the partition. Further rotation causes further inversion of the container resulting in the pouring of the water down the channel, washing the remainder of the food from the channel into the tray and causing a mixing of the feed with the water to form a wet animal food ready for consumption. For some food, it is not necessary to employ the contoured wall but merely to keep the water and food separate until the pouring operation. If this is the case a straight partition as shown in FIG. 2 perpendicular to the bottom wall and extending between two sidewalls is sufficient for the operation of the device.

FIGS. 4, 5, and 6 illustrate an alternate embodiment of the invention which is intended to provide only a single feeding without reloading. In this embodiment, a housing 10a similar to that employed in FIGS. 1 to 3 is utilized and includes an opening 35a in its front wall through which the receptacle 26a extends.

A rod or spindle 76 is affixed in a horizontal position at approximately the vertical midpoint of the housing and supports a bucket or container 78 thereon for rotation about the rod. The bucket may take any form and may be partitioned as shown or may be a single compartment container having sidewalls and a bottom wall. The mounting is effected by means of a pair of brackets 80 which are preferably integrally formed on the underside of the bucket and define a seat for the rod 76 as well as a pair of fingers 81 which extend partially around the rod. The brackets permit rotational movement of the bucket with respect to the rod but also permit easy removal of the bucket from the rod for cleaning and filling. The brackets are mounted on the underside of the bucket 78 in offset relation to the center of gravity of the bucket so that the bucket will normally tend to pivot about the rod and swing downwardly unless maintained in a position on top of the rod as shown in full lines in FIG. 4.

The bucket is further provided with a hook 82 which extends horizontally from that sidewall farthest from the front wall of the housing 10a when the bucket is in an upright position. The hook 82 includes a flat shoulder which is vertically disposed when the bucket is upright.

A timer 86 similar in operation to the timer 18 described in connection with FIGS. 2 and 3 is mounted within the housing and is connected to an electrical outlet not shown. The timer includes an electromagnet 88 and, mounted adjacent thereto, a lever arm 94 mounted for pivotal movement about its midpoint. One end of the lever is provided with a ferromagnetic block 95 located in close proximity to the electromagnet 88, and the other end is provided with an upwardly extending hook 98 having a shoulder designed to engage the shoulder of the hook 82 of the bucket 78 to form a latch. A spring 100 biases the lever 94 so as to maintain the hooks 82 and 98 in engagement with each other and, thus, maintain the bucket 78 in a position in which it straddles the rod 76 and maintains its contents intact.

In the operation of the apparatus of FIGS. 4 through 6, the bucket 78 is filled with the appropriate amount of food and/or water and is placed in the upright position astride the horizontal rod 76 at the location of the brackets 80. The hooks 82 and 98 are engaged to maintain the bucket in such position and to prevent the bucket from rotating about the rod in a counterclockwise direction. The timer 86 is set for the desired feeding time. At the designated time, the timer activates the electromagnet which attracts the ferromagnetic block 95, effecting rotation of the lever 94 in a counterclockwise direction as viewed in FIG. 7, releasing the mating hooks and freeing the bucket for rotation. Because of the offset mounting of the brackets 80, the bucket will rotate in a counterclockwise direction from the upright position to a partially inverted position shown in phantom in FIG. 4. In this position, the leading wall of the bucket rests on the top edge of the channel of the food receptacle 26a and the food is permitted to fall from the container into the receptacle. The bucket illustrated in FIG. 4 is of the partitioned type having a flat internal wall and two compartments, one for water and one for food. A single compartment bucket could also be employed as could a bucket employing the contoured partition shown in FIG. 7.

In contrast to the embodiment shown in FIG. 2, the apparatus illustrated in FIGS. 4 through 6 is a "one-shot" feeder which must be refilled after each feeding. It finds particular application in the evening feeding of domestic animals when the owner does not plan to return home until late.

The present invention has provided a unique apparatus for the automatic feeding of animals without the necessity of the owner or caretaker being on the premises.

While certain specific embodiments have been shown and described, it should be apparent that various modifications may be made therein without departing from the scope of the invention. For example, while the containers shown in FIGS. 1–3 are inverted by means or rods affixed to the disc 12, such inversion could also be accomplished by a solenoid-operated ram actuated by the timer, or through the use of stationary pins mounted in a fixed position on the housing in spaced relation to the axis of rotation of the disc 12. Also, the operation of the timer could be controlled by electrical contacts mounted on the disc 12 engageable with stationary contacts mounted within the housing 10.

Various of the features of the invention are set forth in the following claims.

What is claimed is:

1. An apparatus for automatically feeding animals at a predetermined time, said apparatus comprising a frame, a container defining at least two isolated compartments separated by a liquid-impervious partition, each of said compartments being open adjacent one end of said container, a support for said container mounted on said frame for rotation about a generally horizontal axis, means on said rotatable support for mounting said container for pivotal movement from a position in which said one end of said container is normally uppermost to an inverted position at which said contents therein are discharged, timer and motor means for rotating said support, means on said support for causing pivotal movement of said container at said predetermined time as said support rotates to invert said container sufficiently to cause the contents of said compartments to be discharged therefrom by gravity, and a receptacle mounted below said container and accessible by the animal to receive the contents of both of said compartments essentially simultaneously for intermixing in said receptacle incident to said inversion.

2. An apparatus for automatically feeding animals, said apparatus comprising a frame, a shaft on said frame for turning about a substantially horizontal axis, a support secured to said shaft for rotation about the horizontal axis, time-controlled means for rotating said support at a predetermined time to cause a feeding operation, a spindle extending generally horizontally from said support and spaced from the axis or rotation thereof, a container suspended in free swinging relationship from said spindle and adapted to be advanced in a circular path as said support rotates, said container being open adjacent one end, and inverting means mounted on said rotatable support and spaced from said shaft for rotation about said axis and projecting laterally therefrom in spaced relation to said spindle, said inverting means being movable between a position spaced from said container and a position so as to be engaged by the lower portion of the leading wall of said container during the movement of said container incident to the rotation of said support to pivot said container about said spindle so as to invert said container and cause the contents thereof to be discharged.

3. An apparatus as set forth in claim 2, wherein said support is provided with a plurality of circumferentially spaced spindles, wherein a container is suspended from each of said spindles, wherein a inverting means is provided for each of said spindles, and whereby means are provided for rotating said support periodically a degree of rotation sufficient to effect the inversion of one of said containers.

4. An apparatus as set forth in claim 2, wherein said means for rotating said support comprises a motor and a timer for periodically energizing said motor.

5. An apparatus as set forth in claim 2, wherein said inverting means comprises a rod extending horizontally from said support in parallel relation to said spindle.

6. An apparatus as set forth in claim 2, wherein said container includes a partition dividing said container into two compartments, each of which is open adjacent said one end of said container, and wherein said partition is so configured and disposed as to cause the contents of the respective compartments to be discharged successively rather than simultaneously when said container is inverted.

7. An apparatus in accordance with claim 2, wherein said frame includes a housing enclosing said support effective to prevent access to said containers by the animal, wherein an opening is provided in one wall of said housing, wherein a receptacle is provided outside said housing accessible by the animal, and wherein an inclined trough extends from said receptacle to and through said opening, said trough including an upper portion disposed to receive the contents of said container incident to its inversion and adapted to direct same into said receptacle, said receptacle and trough being readily separable from said housing so as to facilitate cleaning thereof.

8. An apparatus in accordance with claim 7, wherein said container includes means defining a pair of horizontally spaced openings adjacent its upper edge for receiving said spindle, wherein removable means are provided adjacent the outer end of said spindle to retain said container on said spindle during operation of said apparatus, and wherein a sidewall of said housing is displaceable to permit lateral movement of said containers onto and off of said spindle.

* * * * *